J. A. STONE.
TONGUE TRUCK FOR HARVESTERS.
APPLICATION FILED DEC. 26, 1908.
946,885.
Patented Jan. 18, 1910.
2 SHEETS—SHEET 1.
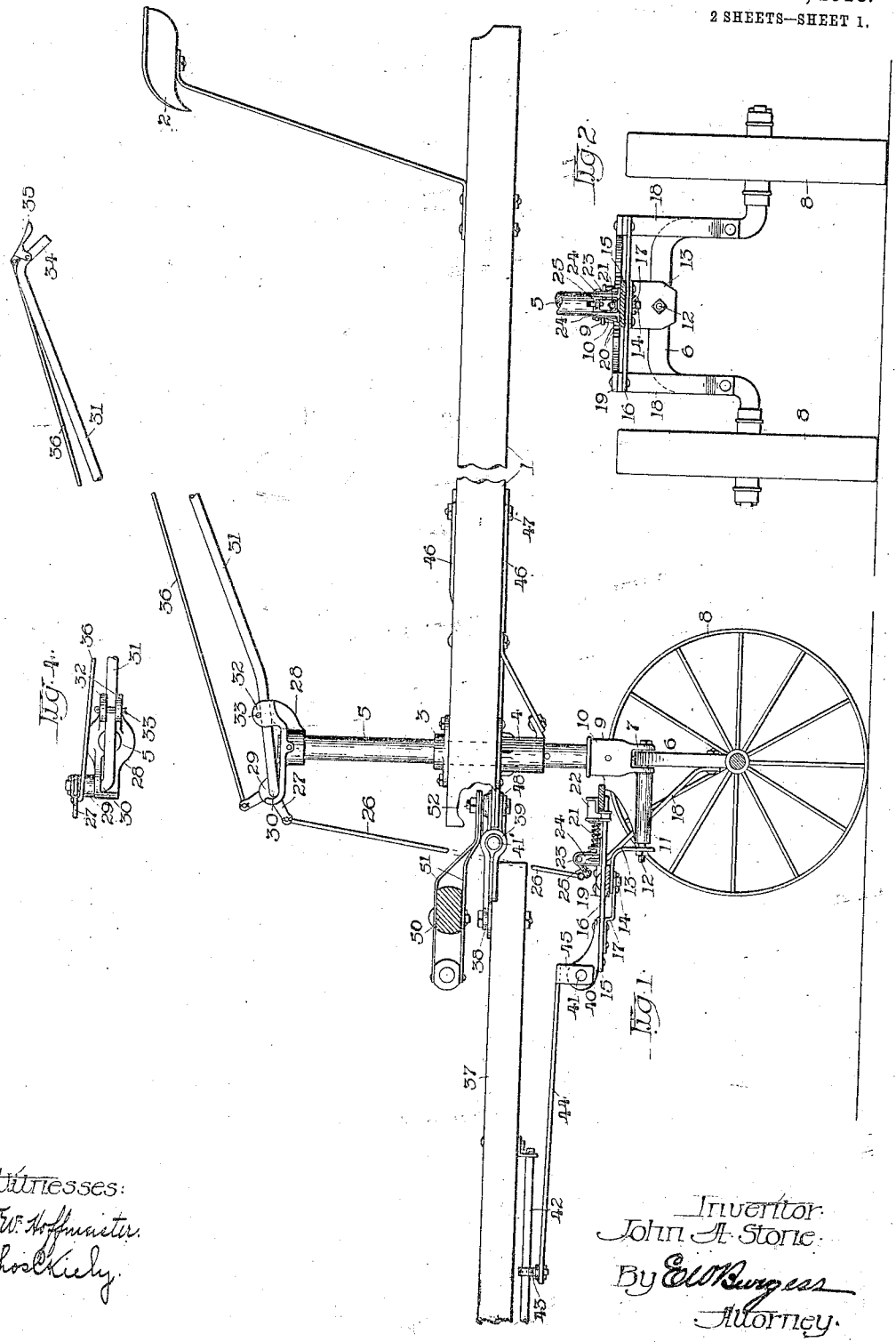
Witnesses:
F. W. Hoffmeister.
Thos. Kiely.
Inventor
John A. Stone.
By E. W. Burgess
Attorney.

J. A. STONE.
TONGUE TRUCK FOR HARVESTERS.
APPLICATION FILED DEC. 26, 1908.
946,885.
Patented Jan. 18, 1910.
2 SHEETS—SHEET 2.
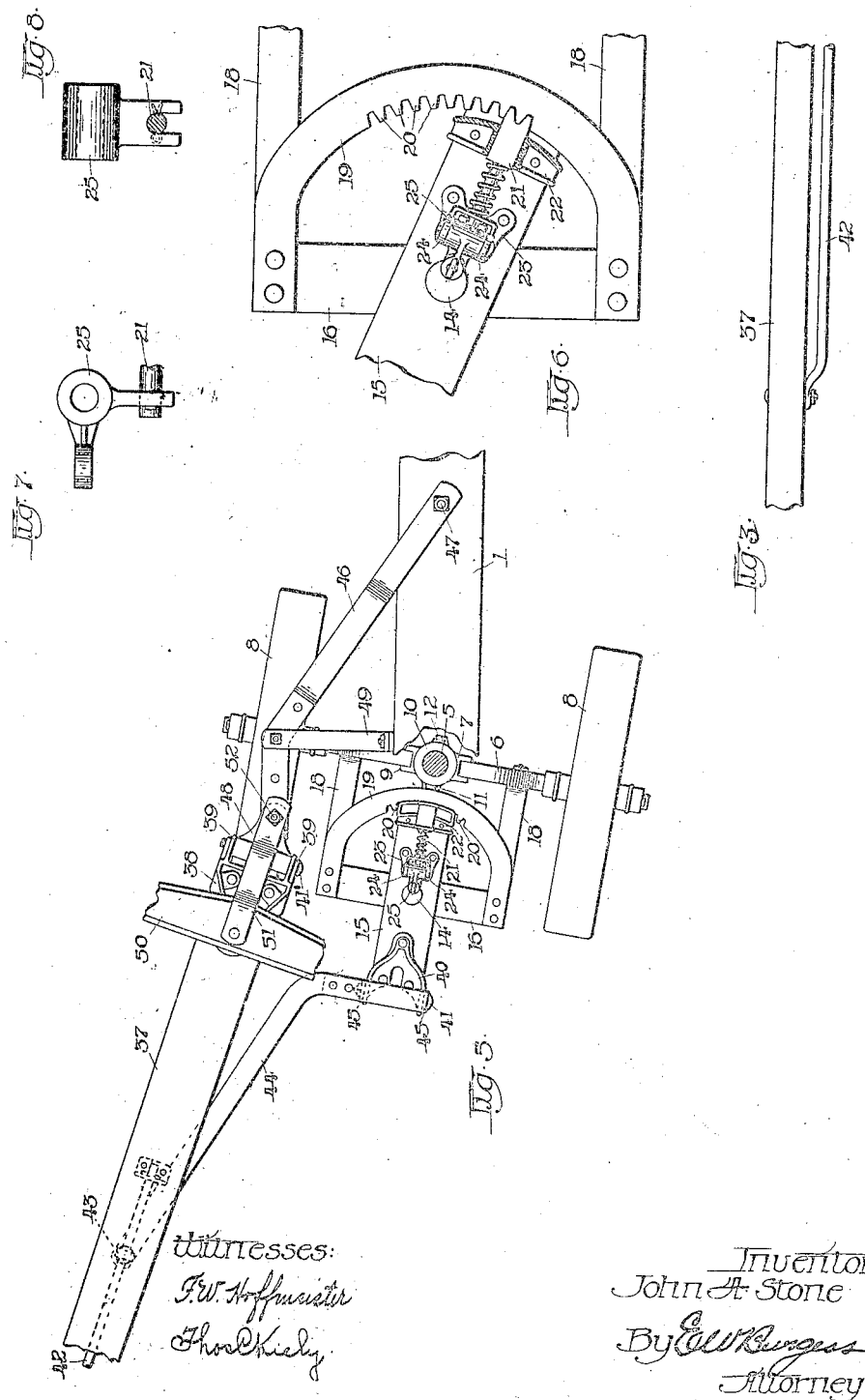
Witnesses:
F. W. Hoffmeister
Thos. Kiely
Inventor:
John A. Stone
By E. W. Burgess
Attorney.

UNITED STATES PATENT OFFICE.

JOHN A. STONE, OF CHICAGO, ILLINOIS, ASSIGNOR TO INTERNATIONAL HARVESTER COMPANY, A CORPORATION OF NEW JERSEY.

TONGUE-TRUCK FOR HARVESTERS.

946,885. Specification of Letters Patent. Patented Jan. 18, 1910.

Application filed December 26, 1908. Serial No. 469,380.

*To all whom it may concern:*

Be it known that I, JOHN A. STONE, a citizen of the United States, residing at Chicago, in the county of Cook and State of Illinois, have invented certain new and useful Improvements in Tongue-Trucks for Harvesters, of which the following is a specification.

My invention relates to tongue trucks designed to be controlled by the operator in a manner whereby the path of movement of the harvester may be governed independent of the line of draft; the object of the invention being to provide a device strong and durable in its construction, easy to manipulate, and efficient in operation. I attain these results by means of the mechanism illustrated in the accompanying drawing, in which—

Figure 1 is a side elevation of a tongue truck embodying my invention; Fig. 2 is a front elevation of a part of Fig. 1; Fig. 3 represents a detail drawing of the guiding means and an associated part of the draft mechanism; Fig. 4 is a detail of the controlling lever mechanism; Fig. 5 is a top plan view of a part of Fig. 1, and designed to illustrate the mode of operation of a part of the truck mechanism; Fig. 6 is a detached detail representing a part of the locking mechanism forming a part of the truck controlling means; Fig. 7 is a side elevation of a detail part of the locking detent mechanism; Fig. 8 is an end elevation of the part shown in Fig. 7.

The same reference numerals designate similar parts throughout the several views.

1 represents a stub tongue, which may be connected with a harvester or like machine in any convenient manner; 2 is a seat for the operator supported by the stub tongue; 3 and 4 represent upper and lower journal boxes secured to the forward end of the stub tongue; 5 represents a vertical spindle journaled in said boxes; 6 is a bent axle pivotally connected with the lower end of the vertical spindle at 7 in a manner to have a limited vibratile movement relative to the axis of the spindle, and 8 represents truck wheels journaled on opposite ends of said axle.

The parts comprising the connection between the lower end of the spindle and the truck axle include a bracket 9, having a vertical socket portion 10 adapted to receive the spindle, a clevis-like lower end adapted to receive the axle, and a horizontal sleeve portion 11 extending forward in the direction of the line of draft and receiving a bolt 12 that passes through the clevis portion and the axle, and at its forward end receives the lower end of a bracket member 13 that extends upward and forward and receives the lower end of a pivot 14, that passes through a longitudinally arranged bar 15 and a transversely arranged bar 16 secured thereto, and the rear end of a hammer strap 17 having its forward end secured to the forward end of the longitudinal bar. The frame members 18 have their forward ends secured to opposite ends of the transverse bar and their lower ends to the bent axle, and 19 represents a segmental rack having its forward ends also secured to opposite ends of the transverse bar and its curved portion slidably engaging with the rear end of the longitudinal bar and provided with teeth 20 upon its inner edge adapted to be engaged with a sliding spring-pressed detent 21, having its inner end arranged in a bracket 22 secured to the longitudinal bar and overlapping the segment rack, and its opposite end supported by a bracket 23 secured to the longitudinal bar and provided with vertically arranged ears 24, between which is pivotally mounted a bell crank lever 25, having one of its arms engaging with the forward end of the detent and the other with the lower end of a rod 26, that has its upper end connected with a bell crank lever 27 at the upper end of the vertical spindle.

28 represents a part secured to the upper end of the spindle and provided with a transversely arranged sleeve 29 adapted to receive the hook end 30 of a hand lever 31, the bell crank lever 27 being pivotally mounted upon an extended portion of the hook 30, and 32 represent ear portions integral with the part 28 and adapted to receive between them the hand lever, and 33 is a retaining pin operative to secure the lever in position, the lever being provided with a hand piece 34 and thumb lever 35, the latter being connected with the bell crank lever 27 by means of a rod 36.

37 represents a draft tongue, having secured to its rear end a member 38 provided with ear portions 39 projecting rearwardly and connected with a member 48 secured to the forward end of the longitudinal bars 46 by means of a pivot pin 41¹.

Hooked to the under side of the draft tongue is a rod 42, and slidably connected with the rod is an eye member 43, to which is secured the forward end of a lever 44 that is curved laterally at its rear end and provided with downwardly extending ear portions 45 that have openings therein to receive the pivot pin 41, whereby the rear end of the bar may be connected with the member 40.

When the lever is connected in the manner described the draft tongue is connected to the stub tongue by means of an angular frame, the latter including laterally and forwardly projecting bars 46, having their rear ends secured to the upper and lower sides of the stub tongue by means of a bolt 47, and at their forward ends provided with a coupling member 48 adapted to connect with the member 38 at the rear end of the draft tongue by means of the pivot pin 41$^1$; and 49 represents a brace member having its outer end secured to the bars 46 and its inner end to the stub tongue. 50 represents the eveners, that are pivotally connected with the forward ends of the bars 46 by means of straps 51 and bolts 52.

In the operation of the mechanism as described, the truck will, through its lever connection with the draft tongue, be guided directly thereby, or, when desirable, it may be turned either to the right or left of the line of draft independent of the movement of the draft tongue, by means of the hand lever and secured in any position of adjustment by means of the locking mechanism.

What I claim as my invention, and desire to secure by Letters Patent, is:

1. A tongue truck, including, in combination, a stub tongue, a truck axle connected with said stub tongue in a manner to turn about a vertical axis, a draft tongue, a lever arm connected with said axle and having a sliding connection with said draft tongue, and means for turning said axle about its vertical pivot independent of the movement of said draft tongue.

2. A tongue truck, including, in combination, a stub tongue, a truck axle connected with said stub tongue in a manner to turn about a vertical axis, a draft tongue, a transverse bar arranged substantially parallel with said axle and in front thereof, a longitudinally arranged bar pivotally connected with said transverse bar by means of a vertical pivot, a lever arm having its rear end pivotally connected with the forward end of said longitudinal bar by means of a transverse pivot, and its forward end slidably connected with said draft tongue, and means for turning said axle about its vertical pivot independent of the movement of said draft tongue.

3. A tongue truck, including, in combination, a stub tongue, a vertical spindle journaled upon said stub tongue, a truck axle pivotally connected with the lower end of said spindle in a manner to be controlled thereby, a draft tongue connected with said stub tongue, a frame secured to said truck axle, said frame including a segmental rack, a longitudinally arranged bar pivotally connected with said frame, a locking mechanism mounted upon said bar and adapted to engage with said rack, a lever arm pivotally connected with said bar and having a sliding connection with said draft tongue, a hand lever arm mounted upon the upper end of said spindle, and connections between said hand lever arm and said locking mechanism.

4. A tongue truck, including, in combination, a stub tongue, a vertical spindle journaled upon said stub tongue, a truck axle pivotally connected with the lower end of said spindle in a manner to be controlled thereby, a truck frame secured to said axle, a draft tongue connected with said stub tongue at one side of the axis of said spindle, a lever arm having its forward end slidably connected with said draft tongue and its rear end pivotally connected with said truck frame, and means operative to turn said axle about its vertical axis independent of the movement of said draft tongue.

5. A tongue truck, including, in combination, a stub tongue, a vertical spindle journaled upon said stub tongue, a truck axle pivotally connected with the lower end of said spindle in a manner to be controlled thereby, a draft tongue connected with said stub tongue at one side of the axis of said spindle, a frame secured to said truck axle, said frame including upwardly extending brace members having their lower ends secured to said axle, a transverse bar secured to the opposite ends of said brace members, a segment rack forming part of said frame, a longitudinally arranged bar pivotally connected with said transverse bar, a locking mechanism secured to one end of said bar and adapted to engage with said segment rack, a lever arm flexibly connected with the opposite end of said bar and having a slidable connection with said draft tongue, a hand lever arm mounted upon the upper end of said spindle and operative to turn it in either direction, and connections between said hand lever arm and said locking mechanism.

6. A tongue truck, including, in combination, a stub tongue, a vertical spindle journaled upon said stub tongue, a truck axle, a bracket including a socket adapted to receive the lower end of said spindle, a clevis portion having said truck axle vibratibly connected therewith, and a forwardly extending sleeve forming part of said bracket, a pivot bolt passing through said clevis, axle and sleeve, a truck frame including upwardly and forwardly inclined frame members having their lower ends secured to said axle, a transverse frame member secured to their outer ends, a segment rack forming part of said frame, a longitudinally arranged bar pivotally connected with said frame, locking mechanism secured to the rear end of said bar and adapted to engage with said segment rack, a lever arm flexibly connected with the opposite end of said bar, a draft tongue having said lever arm slidably connected therewith, a bracket secured to the upper end of said spindle, a hand lever arm secured to said bracket, a bell crank lever arm supported by said bracket and connected with said locking mechanism, and means carried by said hand lever arm to pivotally control the movement of said bell crank lever arm.

JOHN A. STONE.

Witnesses:
 EDW. J. TEUFEL,
 A. B. DACK.